Figure 1:
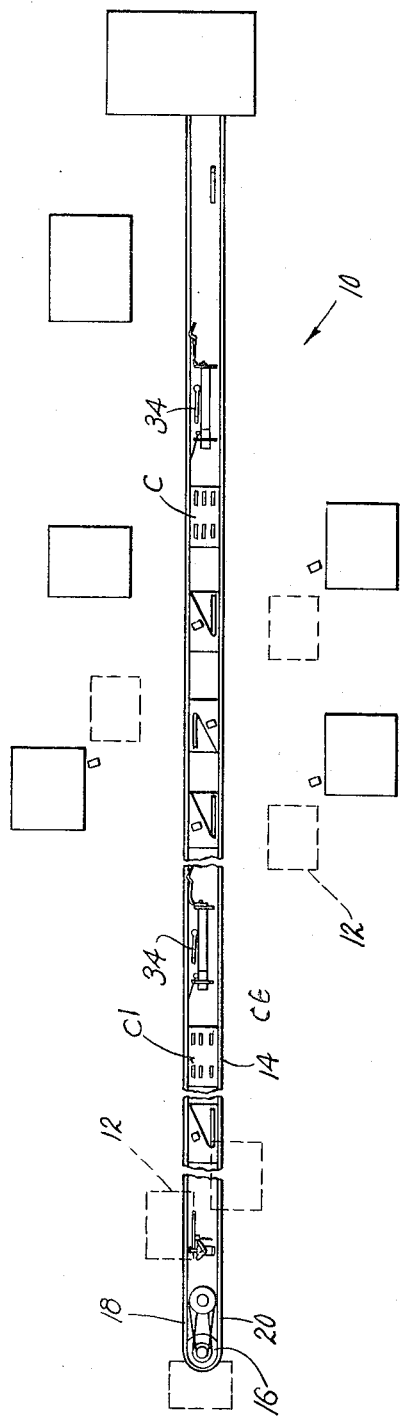

Feb. 21, 1967 R. E. BONNETTE ETAL 3,305,073
CONVEYOR SYSTEMS
Filed April 6, 1964 5 Sheets-Sheet 3

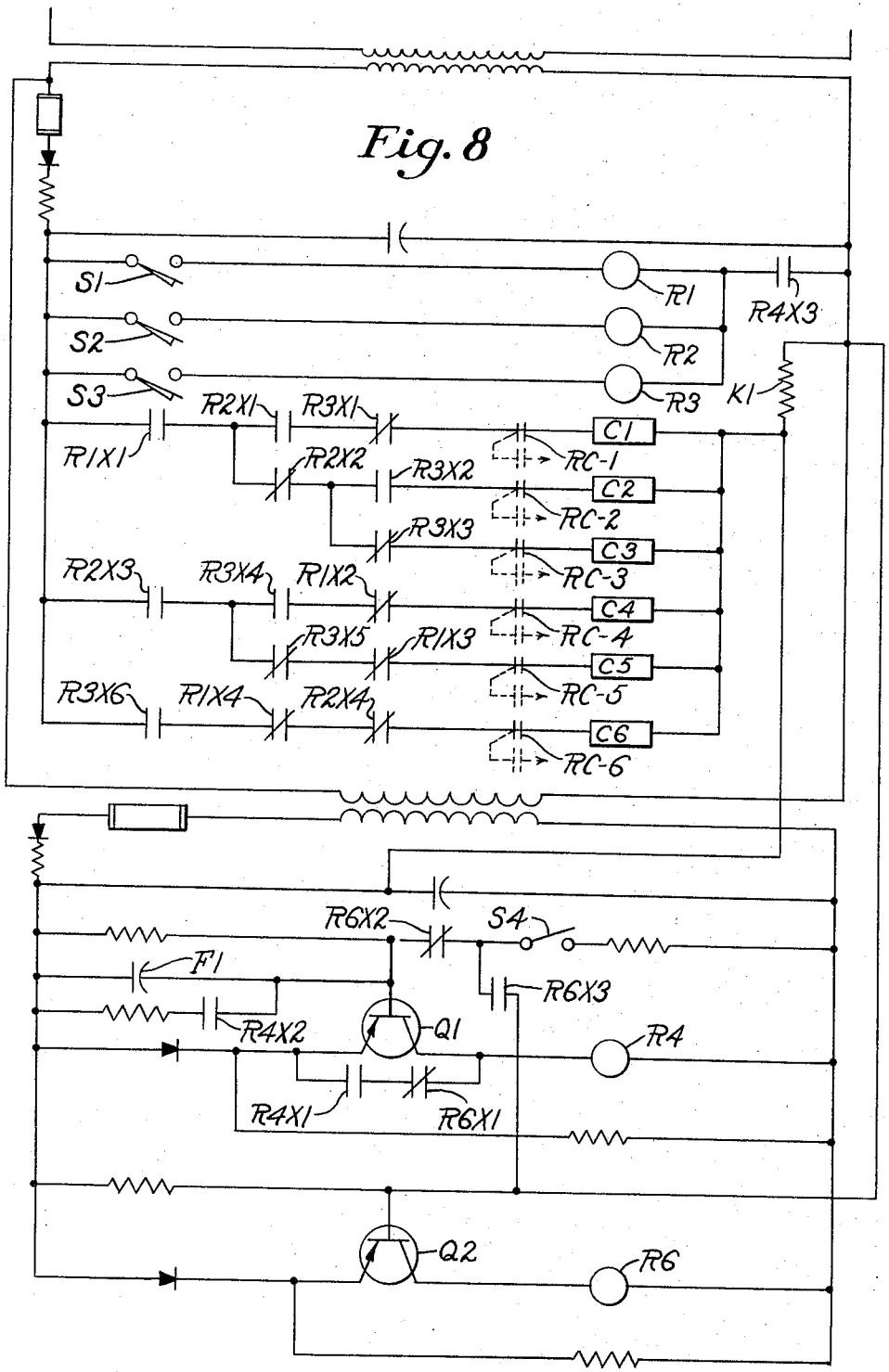

United States Patent Office 3,305,073
Patented Feb. 21, 1967

3,305,073
CONVEYOR SYSTEMS
Roland E. Bonnette, Hamilton, and Frank W. Spencer, Beverly, Mass., assignors to United Shoe Machinery Corporation, Flemington, N.J., a corporation of New Jersey
Filed Apr. 6, 1964, Ser. No. 357,480
3 Claims. (Cl. 198—38)

This invention relates generally to conveyors and has particular reference to a conveyor system of the type adapted to move article carrying devices from a pool position to separate downstream work stations, in which system means is provided for registering the number and type of articles processed by the operator at each work station.

In United States Letters Patent No. 3,130,685, granted April 28, 1964, in the name of Sidney G. Goodrich et al., there is disclosed a conveyor system comprising a floor-mounted tow chain which is adapted to tow article carrying devices from a pool position to various work stations. Means is provided at each work station for releasing racks individually from the pool position and for arresting the released rack when it arrives at the work station.

When a conveyor of this type is used in manufacturing operations in which the operators at the various work stations are compensated according to the number of articles processed, it is necessary to record the number of pieces processed by each operator. In operations in which each operator processes articles of different types, on which the rate of compensation is different types, on which the rate of compensation is different, it is also necessary to record the number of articles of each type processed by each operator.

For example, when a conveyor of this type is used in the manufacture of shoes, as described in the above identified patent application, one pool station may feed racks to a group of work stations at which pulling over, that is the fitting of the upper over the forepart of the last, is accomplished whereas another pool station may feed the racks subsequently to a group of stations at which side lasting is accomplished.

Different racks travelling on the conveyor may contain different types of shoes for which the various operations to be performed have different work rates. For example, one rack may carry shoes having a plain toe, a second may carry shoes having box toe work and a third may carry shoes having a wing tip. The piece work rate for an operation on these different shoe types will vary with the difficulty of the operation. Piece work rates may also be affected by the style of last on which the shoe is made and by the type of material used.

An object of this invention is to provide, in a conveyor system of the type described, means for identifying the type of work carried by each rack, and means for registering the number of racks of each type processed by each operator.

A further object of this invention is to provide a conveyor system of the type described in which means is provided for identifying the type of work carried by the leading rack retained at the pool stop, and means is provided responsive to the release by an operator at a downstream work station of the leading rack at the pool stop to register the release of said rack on an appropriate counter associated with said work station.

Figure 2:
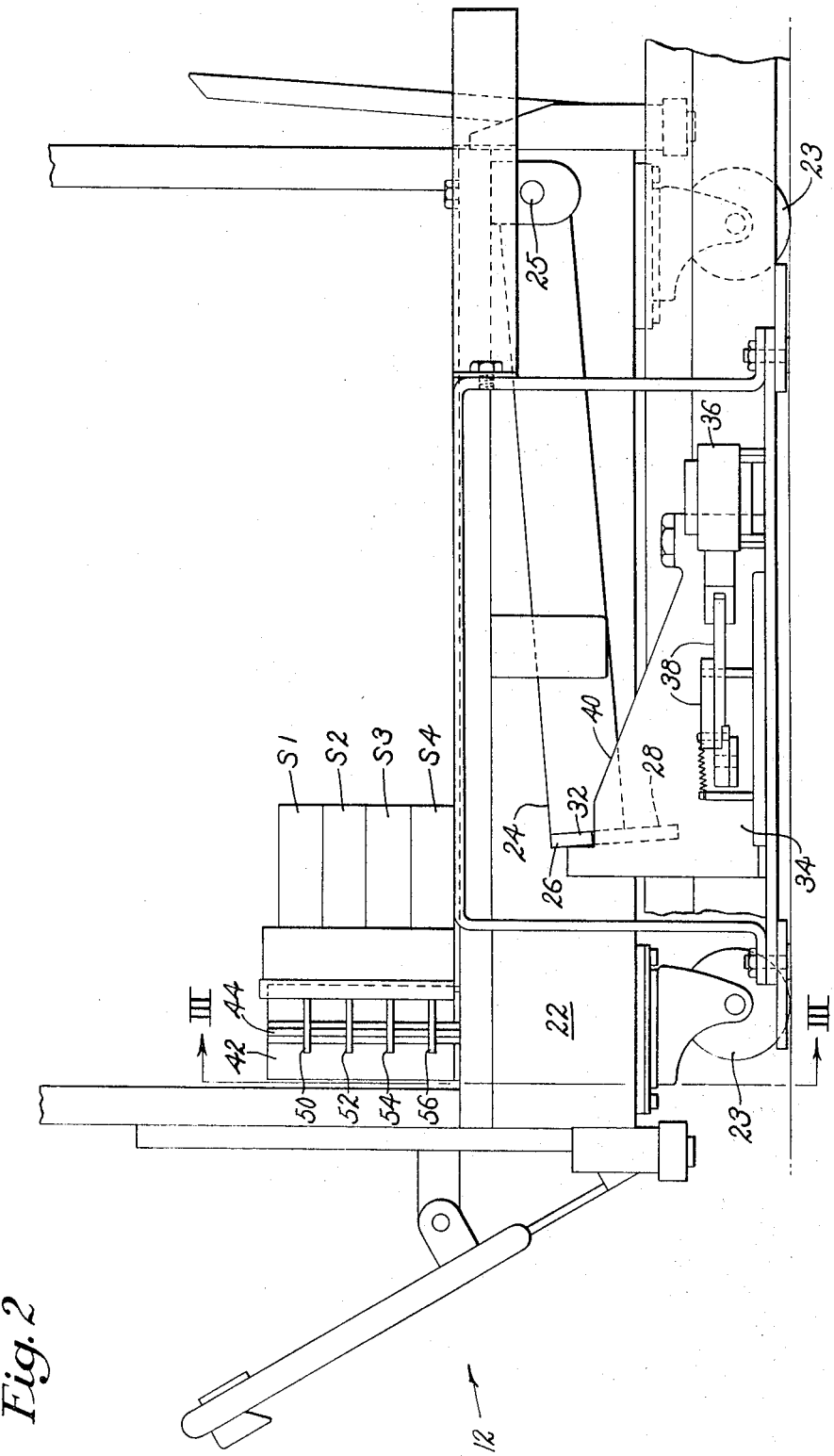
Figure 3:
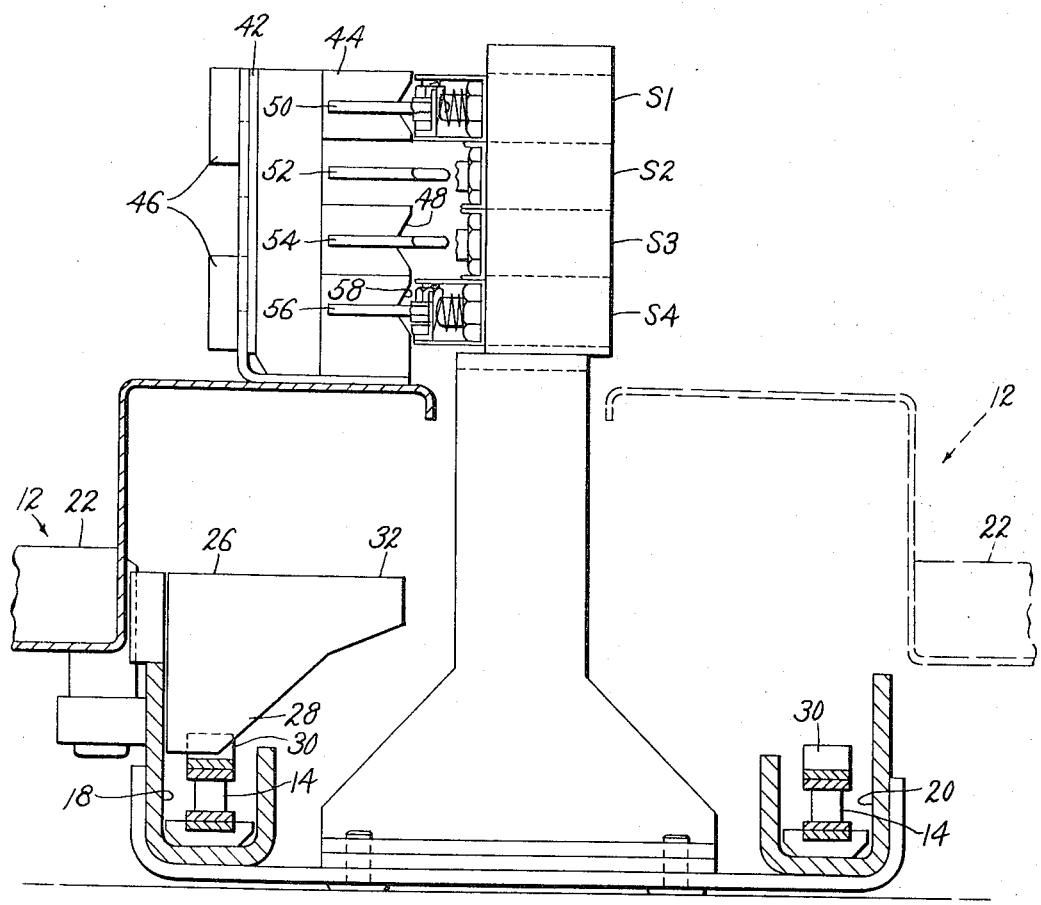
Figure 4:
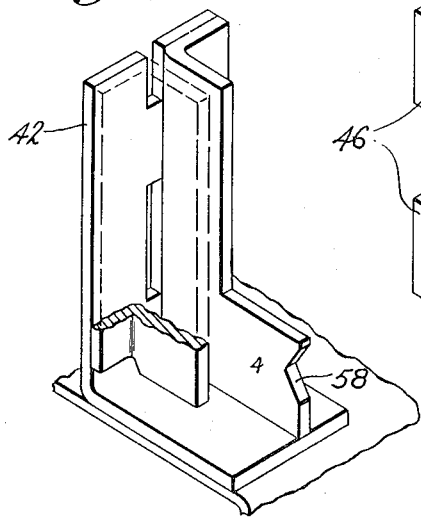
Figure 5:
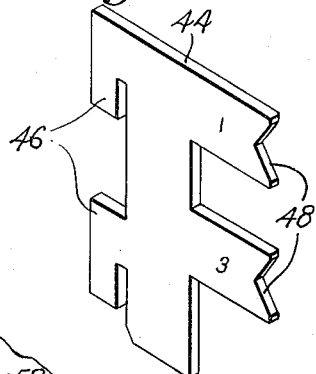
Figure 6:
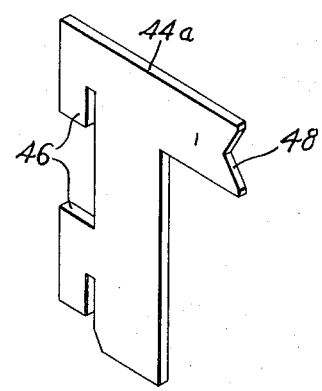
Figure 7:
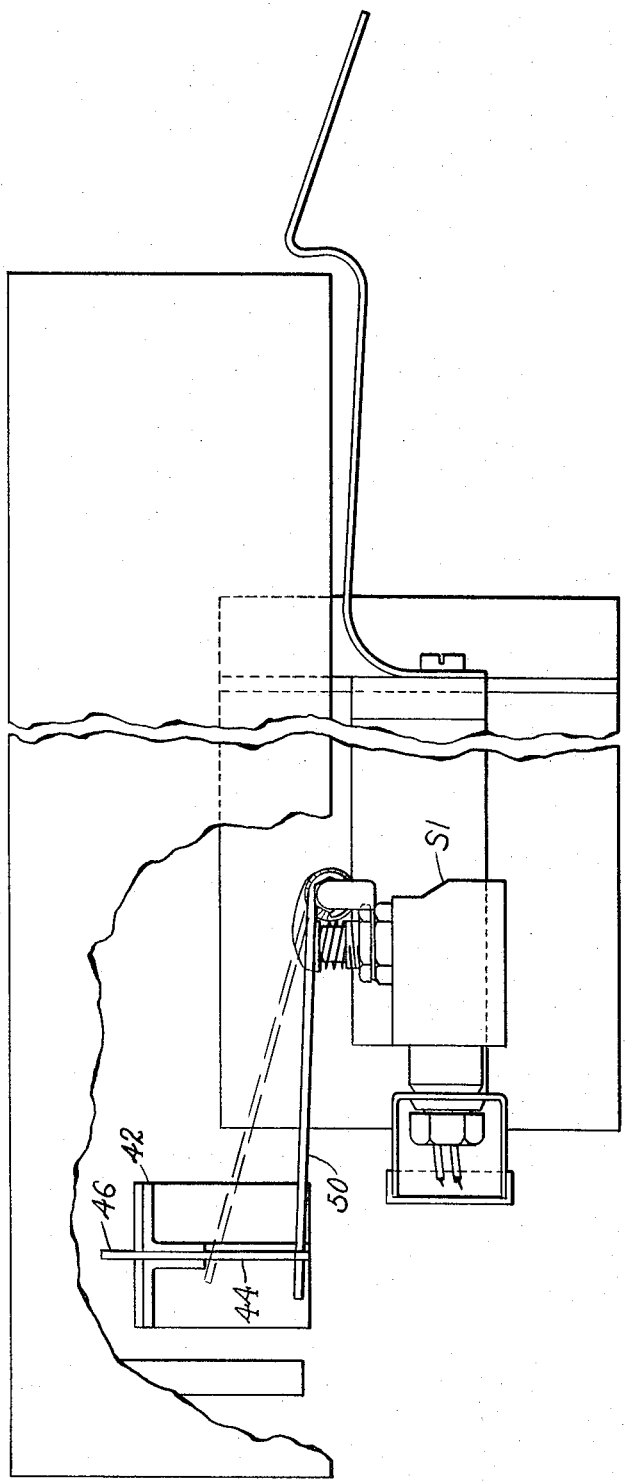

In the drawing:

FIG. 1 is a schematic plan view of a conveyor system embodying the features of the invention;
FIG. 2 is a view in side elevation of a rack adapted for use with the conveyor of FIG. 1, the illustrated rack being stopped at the pool stop;
FIG. 3 is a view in section taken on line III—III of FIG. 2;
FIG. 4 is a perspective view of a code key retainer of the rack;
FIG. 5 is a perspective view of one form of rack coding key;
FIG. 6 is a perspective view of another form of rack coding key;
FIG. 7 is a top plan view of the key code retaining portion of the rack, with certain parts omitted for clarity; and
FIG. 8 is a schematic diagram of an electrical circuit for controlling the register means.

Referring to the drawings, there is illustrated a conveyor system 10, of the type which is adapted to move article carrying devices such as shoe racks 12 or the like between work stations.

The conveyor comprises a continuous chain 14 driven by suitable means (not shown) at one end, said chain travelling around a suitable sprocket wheel 16 at the other end, forming two spaced runs 18 and 20 travelling in opposite directions. As described in the above identified patent, various types of rack arresting mechanism may be disposed between the runs for pooling racks and for arresting racks at the various work stations.

The rack 12 for use with the conveyor system includes a base 22 supported by suitable casters 23 and is adapted to be towed by the conveyor chain by means of a towing arm 24 which is pivoted to the base at pivot 25 and extends forwardly therefrom with a tow plate 26 disposed on the end thereof. The plate 26 has a depending portion 28 for engagement with towing blocks 30 on the chain 14, and a laterally extending portion 32 for engagement with suitably positioned arresting mechanism.

A typical stop mechanism may comprise an arm 34 mounted adjacent to a conveyor run, said arm being pivotal horizontally between a stop position in which the arm is generally parallel to the conveyor run, and a pass position in which the arm is inclined away from the run.

The arm may conveniently be moved between the two positions by means of a solenoid 36 through a suitable linkage 38.

When the arm is in the stop position, the laterally extending portion 32 of the tow plate 26 of an approaching rack rides up the inclined upper surface 40 of the arm 34 (FIG. 2) and disengages the depending portion 28 from the tow chain. When the stop arm is returned to the pass position, the plate 26 drops back into engagement with the chain and the rack is conveyed away from the stop station. If the stop mechansim is serving as a pool stop, it will normally be in the stop position, and will be moved to the pass position momentarily on energization of the solenoid by an operator at a downstream work station. Return to the stop position occurs automatically after a sufficient interval has passed to permit the tow plate 26 to be engaged by the chain to move the rack away from the pool stop.

To provide means for identifying the type of shoe carried by a particular rack, a mounting bracket 42 is provided on the side of the rack adjacent the conveyor for receiving a rack identifying key 44 previously inserted in accordance with the type of work carried in the rack.

The key 44 which may be formed of a flat sheet of material such as plastic, hard board, or the like is provided with a pair of spaced mounting tabs 46 on one edge, so that when mounted on the bracket, the opposite edge 48 projects away from the rack.

The edge 48 of any particular key has a characteristic configuration for cooperating with operating arms 50, 52, and 54 of a series of switches S1, S2 and S3 mounted alongside the conveyor run. The operating arms 50, 52 and 54 are positioned in relation to the pool stop so that the key of the rack stopped at the pool stop engages either one or two of the operating arms depending on the configuration of the edge 48 of the particular key. For example, as illustrated in FIGS. 3 and 7 if the key 44 is disposed in the mounting bracket 42, when the rack is standing at the pool stop, switch arms 50 and 54 will be maintained in the depressed position, so that switches S1 and S3 are closed, whereas if the key 44a illustrated in FIG. 6 were disposed in the mounting bracket, only switch S1 would be closed.

The use of three switches in conjunction with the various possible key configurations and the control circuit employed permits six different types of work to be identified, assuming that each rack key must close one or more of the three switches.

A fourth switch S4 is provided with a switch operating arm 56 positioned to be actuated by a projecting edge 58 of the key mounting bracket 42 of each rack, for a purpose to appear hereinafter.

In the illustrated embodiment of the invention, each work station downstream from the pool stop may be provided with an operator-controlled switch (not shown) for actuating the pool stop mechanism to release the leading rack at the pool stop. Also provided either at each work station or at a central location is a group of counting registers C1–C6 to register the number of racks of each type which have been processed by each operator, in a manner now to be described.

Referring to FIG. 8 there is illustrated a schematic diagram of a circuit for controlling the operation of the rack counting mechanism.

As previously described, when a rack 12 arrives at the pool stop, the key 44 holds at least one of the switches, S1, S2 or S3 in the closed position, and the projecting edge 58 of the mounting bracket holds switch S4 in the closed position.

The closing of switch S4 completes a circuit to the base of transistor Q1 and to capacitor F1. The charging time of capacitor F1 provides a slight time delay, after which the base of transistor Q1 goes negative to permit current flow in the emitter-collector path to energize relay R4 so that:

Contacts R4X1 close to create a holding circuit to relay R4;

Contacts R4X2 close to discharge capacitor F1 to prepare for the next cycle; and Contacts R4X3 close to energize switches S1, S2 and S3, which thereby sets up a circuit now to be described, in a manner which depends on the configuration of the particular key carried by the rack.

The closing of each switch S1, S2 or S3 energizes a corresponding relay R1, R2 or R3, respectively, which sets up circuits through various contact combinations to be described to one of six counters C1–C6 at each work station.

For example if only switch S1 is closed, relay R1 is energized, thereby closing contacts R1C1, creating a circuit through normally closed contacts R2X2 and R3X3 to counter C3 at each work station.

If switch S2 is also closed (in addition to switch S1) contacts R2X2 are opened so that the circuit is not completed to counter C3, and contacts R2X1 are closed to establish a circuit to counter C1.

The counter to which a circuit is completed by each combination of switches actuated is tabulated below:

| Switches Closed | Contacts Closed | Contacts Opened | Circuit completed to counter |
| --- | --- | --- | --- |
| S1 | R1X1 | R1X2, R1X3, R1X4 | C3 |
| S2 | R2X3, R2X1 | R2X2, R2X4 | C5 |
| S3 | R3X2, R3X6 | R3X1, R3X3, R3X5 | C6 |
| S1 and S2 | R1X1, R2X3, R2X1 | R1X2, R1X3, R1X4, R2X2, R2X4 | C1 |
| S1 and S3 | R1X1, R3X2, R3X6 | R1X2, R1X3, R1X4, R3X1, R3X3, R3X5 | C2 |
| S2 and S3 | R2X3, R2X1, R3X2, R3X6 | R2X2, R2X4, R3X1, R3X3, R3X5 | C4 |

As pointed out previously, the key of the rack waiting at the pool stop sets up a circuit to one particular counter, for example, counter C3, at each work station. Thereafter when an operator at a work station releases the leading rack from the pool stop, one count is added to the C3 counter at that work station in the following manner. To receive the rack waiting at the pool stop, the operator at a work station actuates the pool stop solenoid by switch means (not shown) to release the leading rack in the manner previously described. The means for actuating the solenoid also closes register contacts RC1, RC2, RC3, RC4, RC5 and RC6, thereby actuating the counter to which a circuit has been previously established, so that one count is added to the appropriate counter. The circuit to the counter is completed through resistor K1, and the voltage drop thereby created across resistance K1 also appears between the base and emitter of transistor Q2 thereby driving the base positive to permit current flow in the emitter-collector path. Relay R6 is thereby energized which:

Closes contacts R6X3 to create a holding circuit to the base of transistor Q2 to maintain the relay R6 energized;

Opens contacts R6X2 to deactivate the switch S4; and

Opens contacts R6X1 to unlock the holding circuit to relay R4, thereby opening contacts R4X3 and deenergizing any of relays R1, R2 or R3 that are energized. An operator can therefore obtain only a single count on his register even though he presses the rack release button more than once. The counter relay circuits thereafter remain in the deenergized condition until the rack moves away from the pool stop, which opens switch S4, breaking the holding circuit to the base of transistor Q2 so that relay R6 is deenergized and the contacts of said relay return to their original position.

The arrival of the next rack at the pool stop again closes switch S4 and also one or more of the switches S1, S2 and S3 to energize one or more of relays R1, R2 and R3 to set up the circuit to the appropriate counter in the manner previously described.

Although in the illustrated embodiment the means for identifying the type of work carried by the rack is positioned at the pool stop, in some applications it may be desirable to position identifying means at each work station, rather than at the pool position. In other applications it may be more convenient to identify the type of work on the racks while the racks are in motion between the pool station and the work station.

Since certain other changes may be made in the illustrated embodiment of the invention, it is intended that all matter contained herein be interpreted in an illustrative and not a limiting sense.

Having thus described our invention, what we claim as new and desire to secure by Letters Patent of the United States is:

1. A work handling system, comprising a conveyor means for transporting articles between a pool position including a stopping means adjacent to the conveyor means and a plurality of work stations adjacent said conveyor means, each of said work stations having an operator controlled means for releasing the leading article from the pool position for automatic conveyance to the work station which had released the article, detecting means mounted adjacent the conveyor means between the pool position and the first downstream work station for detecting the type of article released from said pool position, and a plurality of register means coupled with the releasing means, the detecting means adding one count to an appropriate register designating the type of article released and the work station.

2. A system as in claim 1 wherein the detecting means comprises a bank of switches selectively closed by a key means mounted upon the article.

3. A system as in claim 2 wherein the key means is easily replaceable by a similar means designating another type of article.

References Cited by the Examiner

UNITED STATES PATENTS

| | | | |
|---|---|---|---|
| Re. 24,098 | 12/1961 | Benson et al. | 198—40 X |
| 2,728,466 | 12/1955 | Postlewaite et al. | 198—38 X |
| 3,075,653 | 1/1963 | Wales et al. | 214—11 |
| 3,214,003 | 10/1965 | Wilson | 198—38 |

EVON C. BLUNK, *Primary Examiner.*

SAMUEL F. COLEMAN, *Examiner.*

R. E. KRISHER, *Assistant Examiner.*